3,639,422
4-PHENYLINDOLE-1 (AND 7)-ACETIC ACIDS

Clifton John Blankley, Ann Arbor, Mich., assignor to Parke, Davis & Company, Detroit, Mich.
No Drawing. Filed July 28, 1969, Ser. No. 845,529
Int. Cl. C07d 27/56
U.S. Cl. 260—326.13 R  5 Claims

ABSTRACT OF THE DISCLOSURE 4-phenylindole - 1 - acetic acid, 4-phenylindole-7-acetic acid, α-methyl derivatives, and carboxylate salts. The compounds are anti-inflammatory agents useful in relieving or preventing inflammation. They can be produced from the corresponding lower alkyl esters by hydrolysis, or from the corresponding α-cyano lower alkyl esters by hydrolysis and accompanying decarboxylation of one of the two resulting carboxyl or carboxylate groups.

SUMMARY AND DETAILED DESCRIPTION

The present invention relates to new alkanoic acid compounds. More particularly, the invention relates to certain 4-phenylindole-1-alkanoic acids and 4-phenylindole-7-alkanoic acids, to salts thereof, and to methods for the production of the foregoing compounds. In the form of the free carboxylic acids, the compounds of the invention can be represented by the formula

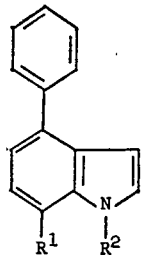

In this formula, one of $R^1$ and $R^2$ represents hydrogen and the other of $R$ and $R^2$ represents a group of the formula

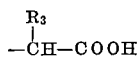

in which $R^3$ represents hydrogen or methyl.

In accordance with the invention, the compounds of the foregoing formula and their salts can be produced by reacting a compound of the formula

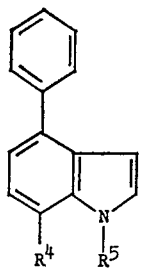

with a hydrolytic agent; where one of $R^4$ and $R^5$ represents hydrogen and the other of $R^4$ and $R^5$ represents a group of the formula

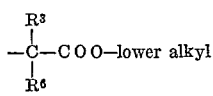

in which $R^3$ represents hydrogen or methyl and $R^6$ represents hydrogen or cyano. The hydrolytic agent is water or an aqueous medium, containing a base or an acid. Basic conditions are preferred. Some examples of suitable bases are alkali metal hydroxides, alkaline earth metal hydroxides, alkali metal carbonates, alkali metal alkoxides, and trialkylammonium hydroxides. A preferred base is sodium hydroxide or potassium hydroxide. Some examples of suitable acids are mineral acids and strong organic acids such as benzenesulfonic acid. A solvent in addition to water can be, and usually is, present. Some examples of suitable solvents are lower alkanols, dioxane, tetrahydrofuran, ethylene glycol, propylene glycol, and diethylene glycol dimethyl ether. When $R^6$ represents cyano, a preferred solvent is aqueous ethylene glycol. When $R^6$ represents hydrogen, a preferred solvent is methanol containing a small amount of water. A considerable excess of the hydrolytic agent is normally used. The time and temperature of the reaction are not particularly critical but are dependent somewhat on the starting material used. When $R^6$ represents hydrogen, the usual reaction conditions are about 0–100° C. or the reflux temperature of the solvent for from 30 minutes to 48 hours, with the shorter times being used at the higher temperatures. The preferred conditions are 20–30° C. for 30 to 40 hours. When $R^6$ represents cyano, the usual reaction conditions are about 50–150° C. for whom 1 to 72 hours, with the preferred conditions being 90–120° C. for 10 to 24 hours. When $R^6$ represents cyano, the usual reaction conditions are somewhat more drastic because the hydrolytic agent, in addition to causing hydrolysis of the ester group, causes hydrolysis of the cyano group to a carboxyl group or carboxylate salt group; the resulting intermediate product with two carboxyl or carboxylate salt groups then undergoes decarboxylation (loss of carbon dioxide) of one of those groups under the conditions of the reaction. The product is isolated either as the free acid or as a salt by adjustment of the pH as necessary. However, when $R^6$ represents cyano, decarboxylation is facilitated by acidifying the reaction mixture prior to isolation of the product.

Starting materials required for use in the foregoing process can be prepared by any of a variety of methods, as illustrated in greater detail hereinafter. For example, pyrrole is reacted with ethylmagnesium bromide under anhydrous conditions and the product reacted with 5-phenylbutyrolactone to give, following hydrolysis, 2-(4-hydroxy - 4 - phenylbutyryl)-pyrrole. Ring closure with polyphosphoric acid produces 4,5-dihydro-4-phenylindol-7(6H)-one, which is converted to ethyl α-cyano-4,5-dihydro-4-phenylindole-$\Delta^{7(6H),\alpha}$-acetate by reaction with ethyl cyanoacetate. Aromatization by heating with palladium on carbon then produces ethyl α-cyano-α-(4-phenyl-7-indolyl)acetate. The latter compound is converted to ethyl α-cyano-α-methyl-α-(4-phenyl-7-indolyl)acetate by reaction with methyl iodide in the presence of sodium hydride. As another example, 6,7-dihydroindol-4(5H)-one is reacted with p-toluenesulfonyl chloride in the presence of sodium hydride to produce 4,5,6,7-tetrahydro-4-oxo-1-(p-toluenesulfonyl)-indole. This is reacted with phenylmagnesium bromide and the product hydrolyzed and dehydrated to give 6,7 - dihydro-4-phenyl-1-(p-toluenesulfonyl)indole, which is aromatized to 4-phenyl-1-(p-toluenesulfonyl)indole by heating with palladium on carbon. Hydrolysis with a strong base then affords 4-phenylindole, which is converted to ethyl 4-phenylindole-1-acetate by reaction with ethyl bromoacetate in the presence of sodium hydride. Alternatively, 4-phenylindole is converted to ethyl α-methyl-4-phenylindole-1-acetate by reaction with ethyl α-bromopropionate in the presence of sodium hydride.

The free carboxylic acids of the invention form carboxylate salts with any of a variety of inorganic and organic bases. Pharmaceutically-acceptable salts are formed with such bases as sodium hydroxide, potassium hydroxide, calcium hydroxide, sodium carbonate, potassium bicarbonate, ammonia, diethylamine, 2-hydroxyethylamine, and choline. The preferred carboxylate salts of the invention are the pharmaceutically-acceptable salts of an alkali metal, an alkaline earth metal, ammonia, or a substituted ammonia. The carboxylic acids and their salts are interconvertible by adjustment of the pH. They differ in solubility properties but are otherwise equivalent for the purposes of the invention.

The compounds of the invention are new chemical compounds of value as pharmacological agents and as chemical intermediates. They are anti-inflammatory agents useful in the relief of inflammatory conditions as well as in the prevention or suppression of the occurrence of inflammation. Their activity can be demonstrated and measured in a standard laboratory test using depilated guinea pigs. In this test procedure animals are given a selected dose of a test compound and these treated animals and untreated controls are subjected to an exposure of ultraviolet radiation sufficient to cause erythema in the untreated animals. An effective dose of an active compound produces a statistically significant degree of protection against the development of erythema. In this test α-methyl-4-phenylindole-7-acetic acid, a preferred compound of the invention, was rated active at an oral dose of 0.4 mg./kg. The compounds are preferably administered by the oral route although parenteral administration can also be used.

The invention is illustrated by the following examples.

EXAMPLE 1

A solution of 3.47 g. of ethyl α-cyano-α-(4-phenyl-7-indolyl)acetate in 80 ml. of 50% aqueous ethylene glycol is treated with 3.18 g. of 85% potassium hydroxide. The mixture is heated at reflux for 20 hours, cooled, diluted with water, washed with ether, acidified, and extracted with chloroform. The chloroform extract is dried and evaporated at reduced pressure to give a residue of 4-phenylindole-7-acetic acid. For purification, the product is dissolved in benzene and the solution chromatographed on a silica gel column. The column is eluated with ether-benzene containing up to 20% ether. The eluates containing the product are combined and evaporated to give the purified product; M.P. 137–139° C. following crystallization from aqueous ethanol.

The starting material can be obtained as follows. A solution of ethylmagnesium bromide is prepared from 6.45 g. of magnesium and 29.7 g. of ethyl bromide in 200 ml. of ether. This solution is cooled to 0–5° C. and treated with a solution of 17.09 g. of freshly distilled pyrrole in 50 ml. of dry benzene added over a period of 20 minutes. After addition is complete and gas evolution has subsided, the mixture (containing pyrrolylmagnesium bromide) is stirred at 20–25° C. for 2 hours, cooled to 5° C. and, with vigorous stirring, treated with a solution of 29.0 g. of 5-phenylbutyrolactone in 100 ml. of dry benzene added over a 20 minute period. The resulting solution is heated at reflux for 1½ hours, cooled, and treated successively with 150 ml. of saturated aqueous ammonium chloride and 100 ml. of water. The organic phase is separated and combined with a benzene-ether extract of the aqueous phase. The combined organic phase is washed with saturated aqueous sodium chloride, dried, and evaporated at reduced pressure to give 2-(4-hydroxy-4-phenylbutyryl)pyrrole; M.P. 97.5–99° C. following trituration with hexane. Ten g. of this product is added to 202.5 g. of polyphosphoric acid at 55–60° C. The temperature is held at this level for 3 hours, then raised to 90° C. and allowed to fall to 45° C. over another 3 hour period. The resulting mixture is poured into cold water and the insoluble precipitate of 4,5-dihydro-4-phenylindol-7(6H)-one is collected on a filter and dried. For purification, the product in chloroform is placed on a silica gel chromatography column and eluted with portions of ethyl acetate-chloroform containing 25–40% ethyl acetate. The eluates containing product are combined and evaporated to give the purified product; M.P. 214–215.5° C. following trituration with ether and crystallization from ethanol. A mixture of 5.0 g. of this product, 5.0 g. of ethyl cyanoacetate, 1.0 g. of ammonium acetate, and 5.0 g. of acetic acid in 25 ml. of benzene is heated at reflux for 9 hours with continuous removal of the water formed in the reaction. An additional 1.64 g. of ammonium acetate is added in portions during the reflux period. The resulting solution is evaporated under reduced pressure to give a residue of ethyl α-cyano-4,5-dihydro-4-phenylindole-Δ$^{7(6H),α}$-acetate; M.P. 169–172° C. following trituration with ether and crystallization from ethyl acetate-cyclohexane. A suspension of 3.0 g. of this product and 1.0 g. of 20% palladium on carbon in 30 ml. of mesitylene is heated at reflux for 8 hours and filtered. The filtrate is evaporated at reduced pressure to give a residue of ethyl α-cyano-α-(4-phenyl-7-indolyl)acetate as an oil, suitable for use without further purification.

EXAMPLE 2

A solution of 11.01 g. of ethyl α-cyano-α-methyl-α-(4-phenyl-7-indolyl)acetate, 200 ml. of 50% aqueous ethylene glycol, and 8.0 g. of 85% potassium hydroxide is heated at reflux for 21 hours. The mixture is diluted with water and washed with ether. The aqueous phase is acidified and extracted with ether. This ether extract is dried and evaporated to give a residue of α-methyl-4-phenyl-indole-7-acetic acid. For purification, the product is dissolved in benzene and the solution chromatographed on a silica gel column. The product, M.P. 105–125° C., is removed from the column by elution with benzene containing 10% of ether. The sodium, potassium, ammonium, and choline salts are obtained by reacting the free acid respectively with sodium hydroxide, potassium carbonate, ammonia, and choline.

The starting material can be obtained as follows. A solution of 14.0 g. of ethyl α-cyano-α-(4-phenyl-7-indolyl)-acetate in 40 ml. of tetrahydrofuran is added over a 20 minutes period to a suspension of sodium hydride (from 1.5 g. of a 50% dispersion in mineral oil, washed with petroleum ether) in 25 ml. of dry tetrahydrofuran. The resulting mixture is stirred at 20–25° C. for 2 hours, treated with a solution of 5.02 g. of methyl iodide in 10 ml. of tetrahydrofuran, and heated at reflux for 3 hours. The mixture is then cooled, poured into dilute hydrochloric acid, and extracted with ether. The ether extract is washed with 2 N aqueous sodium hydroxide and with saturated sodium chloride solution, dried, and evaporated to give ethyl α-cyano-α-methyl-α-(4-phenyl-7-indolyl)acetate as an oil, suitable for use without further purification.

EXAMPLE 3

A solution of 3.0 g. of ethyl 4-phenylindole-1-acetate in 15 ml. of methanol is treated with 0.96 g. of 85% potassium hydroxide. The mixture is stirred at 20° C. for 38 hours and evaporated under reduced pressure. The residue is dissolved in water and the solution is washed with ether. The aqueous phase is acidified and extracted with ether. This ether extract is dried and evaporated to give a residue of 4-phenylindole-1-acetic acid. For purification, the product is dissolved in benzene and the solution chromatographed on 100 g. of silica gel. The product is recovered from the column by elution with benzene containing small proportions of ether. It has M.P. 124–125.5° C. following crystallization from benzene.

The starting material can be obtained as follows. A suspension of sodium hydride (from 8.60 g. of a 55% dispersion in mineral oil, washed with petroleum ether) in 200 ml. of tetrahydrofuran is treated with 20.0 g. of 6,7-dihydroindol-4(5H)-one. The resulting suspension is heated at reflux for 2 hours, then cooled in an ice bath while a solution of 30.0 g. of p-toluenesulfonyl chloride in 50 ml. of tetrahydrofuran is added at a rate to keep foaming under control. The resulting mixture is heated 3 hours at reflux, then cooled and filtered. The filtrate is evaporated at reduced pressure to give a reside of 4,5,6,7-tetrahydro-4-oxo-1-(p-toluenesulfonyl)indole; M.P. 133–134.5° C. after crystallization from 95% ethanol. A solution of 20 g. of this product in 100 ml. of dry benzene is added dropwise at 0–5° C. to a solution of phenylmagnesium bromide, prepared from 16.54 g. of bromobenzene and 2.50 g. of magnesium in 100 ml. of ether. After addition is complete the mixture is allowed to warm to room temperature and then heated at reflux for 2 hours, cooled, and diluted with 100 ml of saturated aqueous ammonium chloride and 50 ml. of water. The organic phase is separated and washed with saturated aqueous sodium chloride, dried and evaporated to give 6,7-dihydro-4-phenyl-1-(p-toluenesulfonyl)indole as a gum, suitable for use without further purification. A solution of 26.0 g. of this product in 250 ml. of mesitylene is treated with 3.0 g. of 20% palladium on charcoal and heated at reflux for 16 hours. The solution is cooled, filtered, and evaporated at reduced pressure to give 4-phenyl-1-(p-toluenesulfonyl)indole as an oil, suitable for use without further purification. A solution of 24.5 g. of this product in 100 ml. of dimethyl sulfoxide is treated with 4.58 g. of 85% potassium hydroxide and heated at 100° C. for 2 hours. The mixture is poured into water and extracted with ether. The ether extract is washed with water, then with saturated aqueous sodium chloride, dried, and evaporated to give a residue of 4-phenylindole which is purified by fractional distillation; B.P. 150–160° C. at 0.5 mm.; M.P. 72.5–74.5° C. after crystallization from cyclohexane. A suspension of sodium hydride (from 1.30 g. of a 55% dispersion in mineral oil, washed with petroleum ether) in 25 ml. of dry benzene is prepared, and to this is added a solution of 5.01 g. of 4-phenylindole in 5 ml. of benzene. The mixture is heated at reflux for 2 hours and cooled. A solution of 5.0 g. of ethyl bromoacetate in 16 ml. of benzene is added, and again the mixture is heated at reflux for 3 hours, filtered, and evaporated at reduced pressure to give ethyl 4-phenylindole-1-acetate as an oil. For purification the product is dissolved in benzene and chromatographed on a column of silica gel. The column is eluted with benzene containing 10% ether and the eluate, on evaporation, gives the product as an oil suitable for use without further purification.

EXAMPLE 4

A solution of 9.27 g. of ethyl α-methyl-4-phenylindole-1-acetate in 50 ml. of methanol is treated with 2.19 g. of 85% potassium hydroxide, and the mixture is stirred at room temperature for 40 hours. The solvent is removed at reduced pressure. The residue is dissolved in water and the solution washed with ether. The aqueous phase is acidified and extracted with ether. This ether extract is dried and evaporated to give α-methyl-4-phenylindole-1-acetic acid; M.P. 117–119° C. following trituration with cyclohexane-ether and crystallization from benzene-hexane. The sodium, potassium, ammonium, and choline salts are obtained by reacting the free acid respectively with sodium hydroxide, potassium carbonate, ammonia, and choline.

The starting material can be obtained as follows. A suspension of sodium hydride (from 1.9 g. of a 55% dispersion in mineral oil, washed with petroleum ether) in 40 ml. of dimethylformamide and 1 ml. of ethanol is prepared, and to this is added 6.0 g. of 4-phenylindole. The mixture is warmed at 50–60° C. for one hour. Two ml. of ethanol is added to remove any excess sodium hydride and then after cooling the mixture to 30° C., 6.75 g. of ethyl α-bromopropionate is added all at once. The mixture is heated at 50–60° C. for 2 hours, cooled, and poured into water. The mixture is extracted with ether and the ether extract is washed with water, with saturated aqueous sodium chloride, dried, and evaporated to give ethyl α-methyl-4-phenylindole-1-acetate as an oil, suitable for use without further purification.

I claim:
1. A member of the class consisting of compounds of the formula

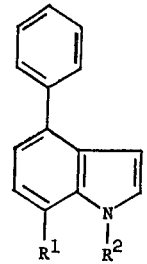

and carboxylate salts thereof; where one of $R^1$ and $R^2$ represents hydrogen, and the other of $R^1$ and $R^2$ represents a group of the formula

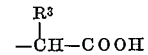

in which $R^3$ is a member of the class consisting of hydrogen and methyl.

2. A compound according to claim 1 which is 4-phenylindole-7-acetic acid.

3. A compound according to claim 1 which is α-methyl-4-phenylindole-7-acetic acid.

4. A compound according to claim 1 which is 4-phenylindole-1-acetic acid.

5. A compound according to claim 1 which is α-methyl-4-phenylindole-1-acetic acid.

References Cited

Wagner et al.: Synthetic Organic Chemistry (1953), pp. 416–17, 429–30.

ALEX MAZEL, Primary Examiner

J. A. NARCAVAGE, Assistant Examiner

U.S. Cl. X.R.

260—326.12 R, 326.16, 326.5 J, 999